2,697,084
Patented Dec. 14, 1954

2,697,084

ADHESIVES COMPRISING POLYVINYL ETHER

Laszlo W. Eger, Metuchen, N. J., assignor to Permacel Tape Corporation, a corporation of New Jersey No Drawing. Application December 15, 1944, Serial No. 568,398

10 Claims. (Cl. 260—27)

This invention relates to pressure-sensitive adhesives and particularly to compositions of matter which are adapted to be used as the adhesive mass on pressure-sensitive adhesive tapes and sheets.

Pressure-sensitive adhesive tape consists of a suitable flexible backing sheet (such as cloth, paper, metal, or transparent film) to the front face of which is applied a thin layer of a pressure-sensitive, normally tacky mass, that is an adhesive mass which adheres to a desired surface merely by being pressed gently against it, and requires neither activation nor setting by heating, wetting, drying, or otherwise to establish adhesion. Such pressure-sensitive masses must be permanently tacky so as to adhere adequately to the desired surface. They must have sufficient cohesion or film strength to produce the required bond between the backing sheet and the surface to which the tape is applied. Also the adhesive bond between the backing and the mass must be stronger than the adhesive bond between the mass and the surface to which it is adhered, in order that the tape may be cleanly removed. In addition, the cohesion of the mass must be so related to the other factors as to permit the tape to be unrolled intact.

Pressure-sensitive tapes having these characteristics have been made successfully, using rubber for the elastomeric base of the adhesive mass, or materials having plastic and elastic qualities similar to rubber. The known pressure sensitive masses, however, have certain disadvantages and limitations for particular uses. For example, rubber masses deteriorate with age in spite of attempts to delay deterioration by compounding with stabilizers called anti-oxidants or age resisters. On aging they show an increase in adhesion attended by a loss in cohesion, causing them to become weak and to separate into two unpleasant sticky masses, one on the tape and the other on the surface to which the tape was adhered. Longer aging causes these masses to lose tackiness and become hard and no longer adhesive. When masses made with rubber or other elastomeric bases are exposed to very low temperatures (e. g., above $-20°$ F.) they first freeze, so that rolls of tape made with them can be separated or unrolled only with great difficulty, and at still lower temperatures the mass becomes non-adhesive so that the tape cannot be applied. This prevents the application of such tape in very high altitudes or on frozen food storage lockers, for example. On the other hand, at abnormally high temperatures (e. g., above 160° F.) the mass flows undesirably, loses cohesion and increases adhesion and this makes it useless for many purposes requiring stability at these temperatures.

This invention is based on my discovery that polyvinyl ethers, which are compounds of the general formula

—$CH_2$—CHOR—$CH_2$—CHOR—$CH_2$—CHOR—

R being an aliphatic radical (see K. H. Meyer) "Natural and Synthetic High Polymers," Interscience, New York, 1942, page 108), especially the highly polymerized vinyl ethers of the lower aliphatic alcohols can be used as the elastomeric bases of adhesive masses and that masses made from these bases satisfactorily withstand aging and exposure to extreme temperatures. The ethers to which I refer are the unsubstituted polyvinyl monoethers of the propyl and butyl alcohols. I have also found that the available polyvinyl ethers, and adhesive masses made from them, gradually decompose on aging unless special precautions are taken to prevent decomposition, such as storing in an atmosphere of ammonia. Upon decomposing they lose some of the properties which are essential for adhesive tapes. However, I have found surprisingly that pressure-sensitive masses made with polyvinyl ethers which thus decompose can be stabilized by compounding the polyvinyl ethers with various substances of the class commonly called anti-oxidants, and that when so stabilized the masses satisfactorily resist aging.

In accordance with my invention I use a polyvinyl ether as the elastomer of pressure-sensitive adhesive tapes. Such tapes are made in any suitable known manner, as by applying the pressure-sensitive mass on the backing by spreading a solution with a knife, or by calendering. The polyvinyl ether may be, for example, polyvinyl isopropyl ether, polyvinyl normal butyl ether, or polyvinyl isobutyl ether. I prefer the vinyl propyl or butyl ethers. I have found that the ethers which have an intrinsic viscosity between 4 and 15 as measured on the Ostwald viscosimeter provide adhesives satisfactory for the invention, but I prefer the range of vinyl ethers having viscosities between 11 and 14. These are the more highly polymerized vinyl ethers. (For description of the Oswald viscosimeter, see Physico-Chemical Methods by Reilly and Rae, vol. 1, p. 548.)

I prefer to compound the polyvinyl ethers with stabilizers. In this class of stabilizers are the following:

I. Hydroxy derivatives of conjugated or condensed ring structures and polyhydroxyphenols, for example phenol, alkylated polyhydroxy phenol, p-hydroxybiphenyl, hydroquinone, and hydroquinone mono benzyl ether.

II. Salts or compounds containing both amine and phenol functional groups commonly referred to as amino-phenols and phenyl amine salts, for example p-hydroxy-N-phenyl morpholine, di-o-tolyl guanidine salt of dicatechol boric acid, and diphenyl amine.

III. Aldehyde amino condensates of the types $RN=CHR'$ and $RN=HCHR'$ where R and R' are any aliphatic or aromatic radicals, or hydrogen, for example, 2,2,4 trimethyl-1,2 dihydroquinoline, butyraldehyde-anilin condensate, acetone anilin condensate a condensation product of p-amino-diphenyl and acetone, and ketone-amine condensate made from acetone and diphenyl amine and also containing n, n' diphenyl p-guanidine.

Among the stabilizers mentioned, I prefer alkylated polyhydroxy phenol, p-hydroxybiphenyl, hydroquinone monobenzyl ether, and diphenylamine, as these have excellent physical properties and in addition do not discolor the mass, thus permitting clear or nearly colorless, transparent adhesive masses to be made for transparent tapes.

The polyvinyl ethers compounded with stabilizers alone make satisfactory adhesives for uses which do not require high adhesiveness. Where greater adhesiveness is required the polyvinyl ethers may be compounded with suitable plasticisers and tackifyers.

I prefer as plasticiser-tackifyer low to medium molecular weight polymers of the vinyl ethers, especially of the butyl or propyl ethers, such polymers having the degree of polymerization which renders the ethers very viscous liquids at room temperatures. Such plasticiser-tackifyers are more compatible with the elastomer than plasticizers and tackifyers of different types, and have the additional advantage of producing transparent pressure-sensitive adhesives which retain their properties at both very high and very low temperatures.

However, I can also use separate plasticisers and tackifyers. As plasticisers I can use mineral oil or a light petroleum oil, said to be an alicyclic oil consisting principally of hydrocarbons having 25 to 30 carbon atoms per molecule and one or more naphthenic or aromatic rings per molecule. I can also use pine tar, or an unsaturated cycloaliphatic oil having the empirical formula $(C_3H_4)_n$ containing about 90% carbon and 10% hydrogen.

Where such plasticisers other than low polymers of the vinyl ethers are used, I may use a rosin type tackifyer such as rosin glyceride, also known as estergum, dehydrogenated natural rosin, hydrogenated rosin, hydrogenated rosin glyceride, or a high-melting cycloparaffin.

Where transparent masses are not required, suitable fillers or extenders may be used. Such fillers include finely divided modified calcium carbonate, and a finely ground glass-silica mixture, titanium dioxide and zinc oxide.

Pressure-sensitive adhesives using as their elastomeric bases polyvinyl ethers containing no age resisters are useful in making short-lived adhesive tapes and sheets, for uses where a short life is of advantage, or at least is not a disadvantage, for example, to protect fine surfaces of articles being assembled or processed in a factory. In such cases loss of cohesive strength or other properties after aging a day or two is not a disadvantage and is frequently an advantage.

Such adhesive protective coatings may be formed as required by spreading suitable solutions of the polyvinyl ethers on a backing. The solutions can be kept from disintegrating in a closed container having an atmosphere of ammonia over the solution.

For other uses requiring longer life, or especially high age resistance, varying amounts of stabilizers may be compounded with the other ingredients, for example from ½% to 2% of the amount of the polyvinyl ether present in the mass.

As specific examples, adhesives can be compounded in a Werner and Pfleiderer mixer or any suitable known type of masticator according to the formulas represented by the ingredients named in the table below in the proportions stated in the respective columns A, B, C, etc.

I do not know why adhesives containing age-resisters in combination with the polyvinyl ether have the demonstrated properties. It is an observed fact that without the age-resisters these ethers are unstable under ordinary conditions. Normal room temperatures, light and possibly the presence of oxygen, or any one of these factors may influence the decomposition. However, when the vinyl ethers are compounded with the age-resisters referred to, the resulting adhesives are stable and retain their desirable properties over a wide range of temperature in the presence of oxygen and ultra-violet light, being superior to known pressure-sensitive adhesives in this respect. In fact the polyvinyl ethers in combination with the preferred age-resisters provide the only known transparent pressure-sensitive adhesive which is usable at both extremely high (e. g., 160° F.) and extremely low (e. g., —20° F.) temperatures.

I claim as my invention:

1. An adhesive sheet comprising a backing and, united thereto, a normally tacky and pressure-sensitive adhesive mass, which mass is more cohesive than adhesive, and wherein: at least about 28.7 per cent by weight of said mass but not more than about seventy-five per cent is solid polymer of vinyl alkyl ether, said alkyl group having from three to four carbon atoms and said polymer having an intrinsic viscosity of from about four to about fifteen; an age resistor; and at least about twenty per

|  | A | B | C | D | E | F | G | H |
|---|---|---|---|---|---|---|---|---|
| Elastomer—Vinyl ethers (high polymer): | | | | | | | | |
|   isopropyl | 37.5 | 30 | 35 | 4.0 | | | | |
|   normal butyl | | | | | 75 | 38 | 29 | |
|   isobutyl | | | | | | | | 34 |
| Plasticiser-Tackifyer—Vinyl ethers (viscous liquid): | | | | | | | | |
|   isopropyl | | 30 | | | | | | |
|   normal butyl | | | | | 25 | 31 | 18 | |
| Tackifyer: | | | | | | | | |
|   Estergum | | | | | | | 12 | |
|   Dehydrogenated Rosin | 37 | | | | | | | |
|   Hydrogenated Rosin | | | | | | | | 34 |
|   Hydrogenated Rosin Glyceride | | 20 | 20 | | | | | |
|   Polycycloparaffin melting about 70° C. | | | | 32 | | | | |
| Plasticiser: | | | | | | | | |
|   Pine Tar | | | 25 | | | | | |
|   Mineral Oil | | 19 | | | | | | |
|   Alicyclic Mineral Oil | 25 | | | | | | | 31.5 |
|   Unsaturated Cycloaliphatic Oil | | | | 27.5 | | | | |
| Filler: | | | | | | | | |
|   Finely Divided Modified Calcium Carbonate | | | 9.5 | | | | | |
|   Finely Ground Glass-Silica Mixture | | | 10 | | | | | |
|   Titanium dioxide | | | | | | | 20 | |
|   Zinc oxide | | | | | | 30 | 21 | |
| Age resister: | | | | | | | | |
|   P-hydroxybiphenyl | .5 | | | .5 | | 1.0 | | .5 |
|   Hydroquinone Monobenzyl Ether | | 1.0 | .5 | | | | 1.0 | |

Pressure-sensitive vinyl ether polymer adhesives of satisfactory adhesiveness for most purposes may be compounded by using a range of constituents within the following percentages shown by analysis of the examples given above:

The high polymeric elastomer may be present in an amount from about 28.7 per cent by weight of the entire adhesive composition as shown in Example G to about seventy-five per cent by weight as shown in Example E.

The tackifier which may be a plasticizer-tackifier as shown in Examples E and F, or a tackifier alone as shown in Example A or any combination thereof as shown in Examples B and G, may be present in amounts of from about twenty per cent by weight as shown in Example C to about fifty per cent by weight as shown in Example B. No plasticizer is necessary in the compositions as shown by Examples E, F and G but where such plasticizers are present it is preferred that they do not exceed about thirty-one and one-half per cent by weight as shown in Example H.

Fillers are not necessary and, in fact, not desirable in transparent compositions such as Examples A, B, E and H, but where they are present they may be used in substantial amounts as illustrated, for instance, by Example G.

Age resistors are usually present in amounts not exceeding about two per cent although, and as was mentioned earlier, they are not necessary for adhesives requiring but a short useful life.

cent but no more than about fifty per cent by weight of a compatible tackifier for said solid polymer.

2. An adhesive sheet comprising a backing and, united thereto, a normally tacky and pressure-sensitive adhesive mass, which mass is more cohesive than adhesive, and wherein: at least about 28.7 per cent by weight of said mass but not more than about seventy-five per cent is solid polymer of vinyl alkyl ether, said alkyl group having from three to four carbon atoms and said polymer having an intrinsic viscosity of from about four to about fifteen; and at least about twenty per cent but no more than about fifty per cent by weight of ester gum.

3. An adhesive composition comprising one part of a high molecular weight normally solid rubbery poly vinyl ether of a saturated aliphatic alcohol having not more than four carbons in the chain and about 0.3 to about 2.3 parts of a rosin ester.

4. An adhesive composition comprising one part of a high molecular weight normally solid rubbery poly vinyl ether of a saturated aliphatic alcohol having not more than four carbons in the chain; a morpholine stabilizer for said poly vinyl ether; and about 0.3 to about 2.3 parts of a compatible non-volatile plasticizer.

5. An adhesive sheet comprising a backing and, united thereto, a normally tacky and pressure sensitive adhesive mass, which mass is more cohesive than adhesive, and comprising: one part of a high molecular weight normally solid rubbery polyvinyl ether of a saturated aliphatic alcohol having not more than four carbons in the chain; a stabilizer for said polyvinyl ether; and about 0.3 to about 2.3 parts of a compatible non-volatile plasticizer.

6. An adhesive sheet according to claim 5, wherein the plasticizer is a viscous liquid vinyl ether polymer.

7. An adhesive sheet according to claim 5 wherein the plasticizer is a viscous liquid polymer of a vinyl butyl ether.

8. An adhesive sheet according to claim 5 wherein the plasticizer is a viscous liquid polymer of vinyl propyl ether.

9. An adhesive sheet according to claim 5 wherein the normally solid polyvinyl ether is a polyvinyl butyl ether.

10. An adhesive sheet according to claim 5 wherein the normally solid polyvinyl ether is polyvinyl isopropyl ether.

References Cited in the file of this patent

UNITED STATES PATENTS

| Number | Name | Date |
|---|---|---|
| 2,061,934 | Mueller-Cunradi | Nov. 24, 1936 |
| 2,104,002 | Reppe et al. | Dec. 28, 1937 |
| 2,115,896 | Wiezevich | May 3, 1938 |
| 2,300,587 | Menger | Nov. 3, 1942 |
| 2,341,553 | Houtz | Feb. 15, 1944 |
| 2,349,508 | Mack | May 23, 1944 |
| 2,410,089 | Lundquist et al. | Oct. 29, 1946 |
| 2,415,901 | Nelson | Feb. 18, 1947 |

FOREIGN PATENTS

| Number | Country | Date |
|---|---|---|
| 482,512 | Great Britain | Mar. 28, 1938 |
| 891,493 | France | Dec. 11, 1943 |

OTHER REFERENCES

Meyer, Natural and Synthetic High Polymers, Interscience 1942, pages 21 to 23, 108 and 109.